United States Patent
Bouchez et al.

(10) Patent No.: US 6,327,851 B1
(45) Date of Patent: Dec. 11, 2001

(54) PROCESS FOR CONTROLLED INJECTION OF HYDROCARBONS INTO AN EXHAUST LINE OF AN INTERNAL-COMBUSTION ENGINE

(75) Inventors: Mathias Bouchez, Meudon; Brigitte Martin, Saint Genis Laval; Patrick Bourges, Rueil-Malmaison, all of (FR)

(73) Assignee: Institut Francais du Petrole, Rueil-Malmaison cedex (FR)

( * ) Notice: Subject to any disclaimer, the term of this patent is extended or adjusted under 35 U.S.C. 154(b) by 0 days.

(21) Appl. No.: 09/301,603

(22) Filed: Apr. 29, 1999

(30) Foreign Application Priority Data

Apr. 29, 1998 (FR) .................................................. 98 05363

(51) Int. Cl.$^7$ ...................................................... F01N 3/00
(52) U.S. Cl. .................................. 60/286; 60/299; 60/301
(58) Field of Search ............................. 60/274, 286, 295, 60/301, 299

(56) References Cited

U.S. PATENT DOCUMENTS

| | | |
|---|---|---|
| 5,209,061 | 5/1993 | Takeshima . |
| 5,272,871 * | 12/1993 | Oshima et al. ........................ 60/301 |
| 5,473,887 * | 12/1995 | Takeshima et al. .................... 60/276 |
| 5,522,218 | 6/1996 | Lane et al. . |
| 5,605,042 * | 2/1997 | Stutzenberger ........................ 60/301 |
| 5,609,022 * | 3/1997 | Cho ........................................ 60/286 |
| 5,806,310 * | 9/1998 | Daidou et al. ......................... 60/286 |
| 5,884,476 * | 3/1999 | Hirota et al. .......................... 60/286 |
| 5,987,885 * | 11/1999 | Kizer et al. ............................ 60/286 |
| 6,016,653 * | 1/2000 | Glassey et al. ........................ 60/274 |
| 6,045,764 * | 4/2000 | Iizuka et al. ...................... 423/213.5 |

FOREIGN PATENT DOCUMENTS 0709129    5/1996    (EP) .

* cited by examiner

Primary Examiner—Thomas Denion
Assistant Examiner—Diem Tran
(74) Attorney, Agent, or Firm—Antonelli, Terry, Stout & Kraus, LLP

(57) ABSTRACT

The present invention relates to a process for controlled injection of hydrocarbons into an exhaust line of a lean-burn internal-combustion engine, comprising catalytic elimination of the nitrogen oxides.

The process according to the invention consists in injecting a certain amount of hydrocarbons upstream from the catalytic elimination, periodically and for a short time interval, by means of pulsed hydrocarbon injections.

The frequency and the amplitude of the hydrocarbon pulses are preferably controlled according to the running conditions of the engine.

10 Claims, 1 Drawing Sheet

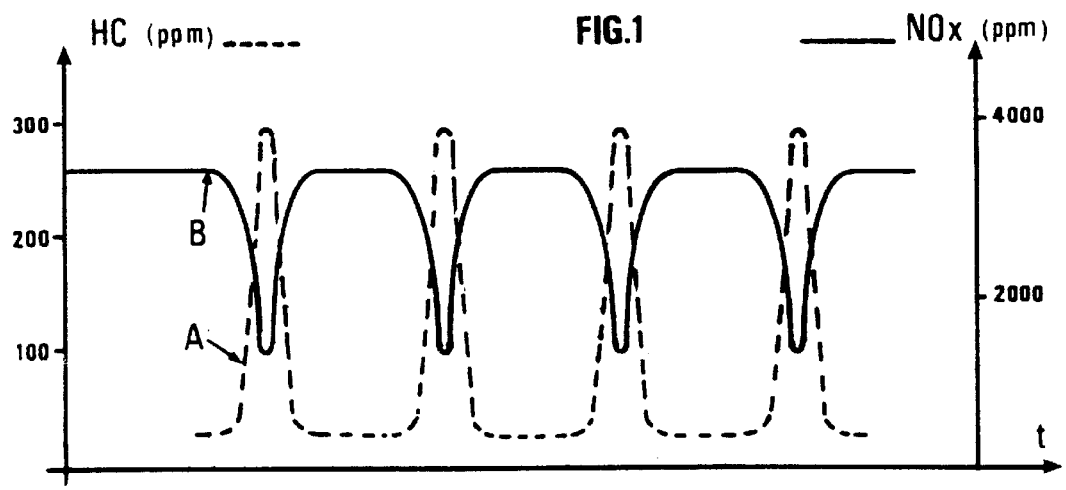
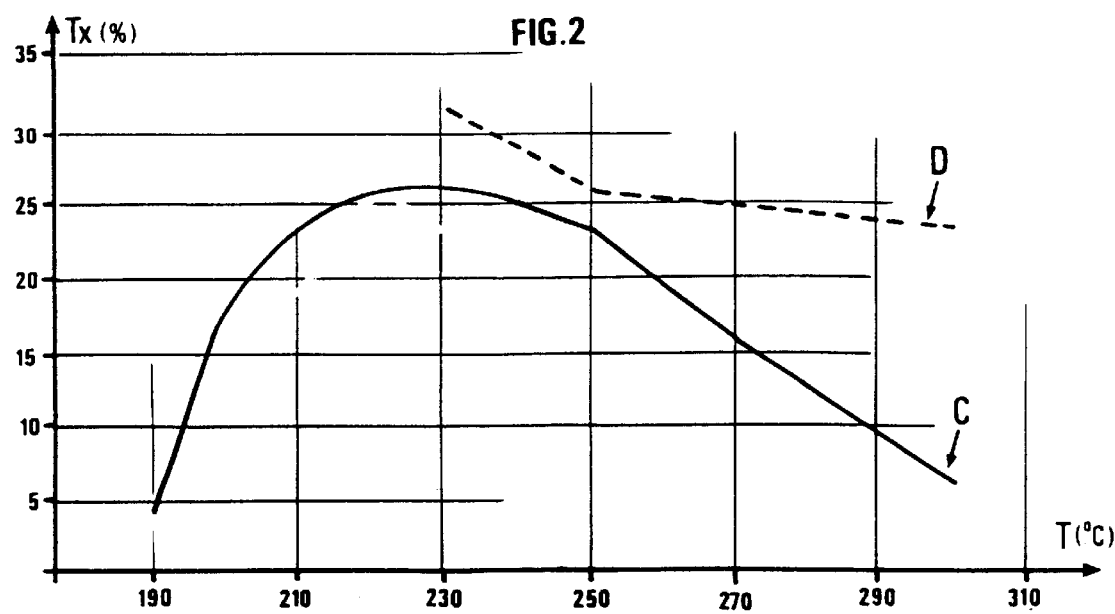

PROCESS FOR CONTROLLED INJECTION OF HYDROCARBONS INTO AN EXHAUST LINE OF AN INTERNAL-COMBUSTION ENGINE

FIELD OF THE INVENTION

The present invention relates to the field of elimination of nitrogen oxides discharged at the exhaust of internal-combustion engines, notably those running on lean mixture.

BACKGROUND OF THE INVENTION

There are various well-known catalytic formulations allowing to convert nitrogen oxides in the exhaust line before the exhaust gases are discharged to the atmosphere.

The most commonly used formulations are Platinum/Alumina, which are especially active at low temperatures (of the order of 200° C.) and the copper/zeolite formulations, which are active at higher temperatures (of the order of 350° C.).

However, the efficiency of nitrogen oxides reduction in an oxidizing medium depends on the running conditions of the engine and notably on the temperature and the flow of the exhaust gases.

The ratio of the reducers contained in the exhaust gases to the nitrogen oxides ($NO_x$) is also very important, as explained hereafter.

The reducers involved in the catalytic reduction of nitrogen oxides in an oxidizing medium are mainly hydrocarbons (HC).

A problem arises when these reducers are not in sufficient quantities to ensure proper conversion of the nitrogen oxides. Diesel engines for example present this type of drawback. The $HC/NO_x$ ratios are then far less than one, whereas the activity of the catalysts is really significant only with $HC/NO_x$ ratios greater than one.

There are various known means allowing to increase the hydrocarbon content of exhaust gases.

It is well-known to inject hydrocarbons directly into the exhaust line, upstream from the catalytic conversion. A specific system, independent of the engine, is then used.

Engines equipped with a high-pressure fuel injection system referred to as <<common rail>> allow controlled hydrocarbon injections in the engine itself. Pilot injections of fuel before or after the main injection allow to change the composition of the gases at the exhaust and notably the reactivity to the catalyst.

The hydrocarbons can thus be significantly increased at the exhaust and a sufficient concentration can be obtained to reduce the nitrogen oxides on the catalyst.

It is well-known that the catalytic formulations used for nitrogen oxides reduction in an oxidizing medium are characterized by a relatively narrow temperature range, so that the major part of the operating process does not get a satisfactory conversion.

Known injections of additional fuel at the exhaust are furthermore performed continuously, which implies a certain <<additional consumption>>.

In order to remedy these drawbacks and to improve the activity of a $deNO_x$ catalyst, it is possible, according to the invention, to adopt a particular hydrocarbon injection strategy.

SUMMARY OF THE INVENTION

The object of the present invention thus is a process for controlled injection of hydrocarbons into an exhaust line of an internal-combustion engine running on lean mixture, comprising catalytic elimination of nitrogen oxides.

According to the invention, the process consists in injecting a certain amount of hydrocarbons upstream from the catalytic elimination, periodically and for a short time interval, by means of pulsed hydrocarbon injections. More precisely, said conversion is carried out with a catalyst having a Platinum/Alumina type formulation.

According to the invention, the frequency and the amplitude of the hydrocarbon pulses are controlled according to the running conditions of the engine.

According to a particular feature of the invention, injections are controlled by a computer.

Furthermore, the temperature of the exhaust gases can be measured upstream from the catalytic elimination.

Injection thus is controlled according to the temperature of the exhaust gases.

The process according to the invention is preferably implemented for temperatures allowing oxidation of the hydrocarbons sent to the catalyst in pulses.

The hydrocarbons injected are preferably gas-oil type hydrocarbons.

The temperatures used are preferably higher than 200° C. and they more particularly range between 230° C. and 300° C.

Without departing from the scope of the invention, it is possible to combine pulsed hydrocarbon injections with a continuous hydrocarbon injection.

According to the invention, the time between the end of an injection and the start of the next injection ranges between 1 and 10 s.

More precisely, the injection time ranges between 1 and 10 s.

The amount of hydrocarbons injected is advantageously such that a gas whose composition has a $HC/NO_x$ ratio ranging between 1 and 30 is obtained upstream from the catalytic elimination.

According to a particular embodiment of the invention, the amount of hydrocarbons injected is such that a gas whose composition has some excess oxidizer is obtained upstream from the catalytic elimination.

BRIEF DESCRIPTION OF THE DRAWINGS

Other features, advantages and details of the invention will be clear from reading the description hereafter, given by way of non limitative example, with reference to the accompanying drawings wherein:

FIG. 1 shows curves illustrating the implementation of the process according to the invention, and FIG. 2 shows conversion rates obtained for different temperatures, according to the invention and according to the prior art.

DETAILED DESCRIPTION OF THE INVENTION

More precisely, FIG. 1 shows, with curves A and B, the implementation and the interest of the invention.

Curve A shows periodic and pulsed injections of hydrocarbons into the exhaust line, upstream from the catalytic conversion.

Curve B relates to the <<response>> of the catalyst to these injections, i.e. the amount of nitrogen oxides measured downstream from the conversion catalyst.

It clearly appears that each hydrocarbon pulse markedly decreases the amount of nitrogen oxides discharged at the exhaust. The response of the catalyst is very sensitive to the hydrocarbon gradient.

Successive hydrocarbon <<peaks>> thus allow to reach higher conversion rates than those that would be obtained with a continuous injection.

The peaks are preferably obtained with injections whose duration ranges between 1 and 10 s. A series of pulses favouring $NO_x$ reduction is thus achieved as it has been noticed that activation of the nitrogen oxides reduction lasts for a period of that order. This is a minimum length of time for the catalyst surface to be regenerated.

FIG. 2 shows more precisely the conversion gain obtained according to the invention.

The hydrocarbons injected are gas-oil according to this embodiment; the catalyst support comprises platinum on alumina and the hourly space velocity is of the order of 40,000 $h^{-1}$.

These curves show the rate of conversion of nitrogen oxides as a function of the exhaust gas temperature.

Curve C relates to a conventional injection, i.e. continuous, whereas curve D relates to the implementation of the invention.

The measurements taken under the particular conditions defined above show that, for temperatures ranging between 230° C. and 300° C., the conversion rate is always higher than that of the prior art. The conversion gain is notably significant for temperatures above 250° C.

According to the running conditions of the engine, the frequency and the amplitude of the pulses are optimized in order to obtain maximum catalyst efficiency while limiting the overconsumption linked with the additional injection of hydrocarbons.

Implementation of the invention thus requires a nitrogen oxides catalyst placed in the exhaust line. Catalysts allowing nitrogen oxides reduction in an oxidizing medium usually consist of precious metals and/or of transition metals. An injection system, exterior or interior to the engine, is also necessary. It must allow the hydrocarbon concentration to be significantly increased upstream from the catalyst.

The injection system is preferably controlled by a computer, such as the one that controls the different other equipments of the engine.

The computer receives information such as the temperature at the catalyst inlet, the $NO_x$ concentration of the exhaust gases, the flow and the composition of the gases. According to all these data and to preprogrammed strategies, the computer decides whether a continuous injection or pulsed injections in accordance with the invention should be applied.

Without departing from the scope of the invention, a pulsed injection can be applied in combination with a continuous hydrocarbon injection. In other words, there is no need to start from an absence of injection to perform a pulsed injection. In the application instance mentioned above, if the temperature of the gases is relatively low, for example less than 200° C., continuous injection will be preferably selected. For higher temperatures, the invention will be implemented because the expected gain is significant. The computer thus determines the optimum amount of hydrocarbons to be injected, depending on the case. For operation according to the invention with hydrocarbon pulses, the frequency and the amplitude of these pulses are determined by the computer according to the information received.

The aim is to obtain maximum conversion while limiting the overconsumption linked with postinjection.

Advantageously, the amount of hydrocarbons injected is such that a gas whose composition has a $HC/NO_x$ ratio ranging between 1 and 30 is obtained upstream from the catalytic elimination. In the aforementioned ratio, the hydrocarbons are expressed in ppmc and the nitrogen oxides in ppm.

In particular, the amount of hydrocarbons injected is such that a gas whose composition has some excess oxidizer is obtained upstream from the catalytic elimination, the mixture concerned being a lean mixture.

What is claimed is:

1. A process for controlled injection of hydrocarbons into an exhaust line of a lean-burn internal-combustion engine, comprising catalytic elimination of nitrogen oxides from exhaust gases, characterized in that the process comprises monitoring the temperature of the exhaust gases, injecting a certain amount of hydrocarbons upstream from the catalytic elimination, periodically and for a short time interval, by means of pulsed hydrocarbon injections, according to the temperature of the exhaust gases when the temperature of the exhaust gases is at least 200° C., and carrying out catalytic conversion of the nitrogen oxides with a catalyst having a Platinum/Alumina type formulation, and characterized in that the pulsed hydrocarbon injections are combined with a continuous hydrocarbon injection.

2. A process as claimed in claim 1, characterized in that the injection time ranges between 1 and 10 s.

3. A process for controlled injection of hydrocarbons into an exhaust line of a lean-burn internal-combustion engine, comprising catalytic elimination of nitrogen oxides from exhaust gases, characterized in that the process comprises monitoring the temperature of the exhaust gases, injecting a certain amount of hydrocarbons upstream from the catalytic elimination, periodically and for a short time interval, by means of pulsed hydrocarbon injections, according to the temperature of the exhaust gases when the temperature of the exhaust gases is at least 200 C., the time between the end of an injection and the start of the next injection ranging between 1 and 10 s, and carrying out catalytic conversion of the nitrogen oxides with a catalyst having a Platinum/Alumina type formulation.

4. A process as claimed in claim 3, characterized in that the frequency and the amplitude of the hydrocarbon pulses are controlled according to the running conditions of the engine.

5. A process as claimed in claim 3, characterized in that injections are controlled by a computer.

6. A process as claimed in claim 3, characterized in that the temperature of the gases is furthermore measured upstream from the catalytic elimination.

7. A process as claimed in claim 3, characterized in that the hydrocarbons injected consist of gas-oil.

8. A process as claimed in claim 3, characterized in that the process is implemented for exhaust gas temperatures ranging between 230° C. and 300° C.

9. A process as claimed in claim 3, characterized in that the amount of hydrocarbons injected is such that a gas whose composition has $HC/NO_x$ ration ranging between 1 and 30 is obtained upstream from the catalytic elimination.

10. A process as claimed in claim 3, characterized in that the amount of hydrocarbons injected is such that a gas whose composition has some excess oxidizer is obtained upstream from the catalytic elimination.

* * * * *